Patented Feb. 13, 1940

2,189,948

UNITED STATES PATENT OFFICE 2,189,948

STERILIZATION OF PANCREATIN

Carroll L. Griffith and Lloyd A. Hall, Chicago, Ill., assignors to The Griffith Laboratories, Inc., Chicago, Ill., a corporation of Illinois No Drawing. Application October 31, 1938, Serial No. 238,080

6 Claims. (Cl. 195—65)

The present invention relates to a process of sterilizing pancreatin to a high degree without loss of enzymic activity.

Pancreatin is a biological product wherein an enzyme is the active constitutent, for which "pancreatin" is commonly employed. Pancreatin as commercially available has a moisture content of about 8 to 10%. It is very desirable that micro-organic life, particularly bacteria, be killed without destruction of the normal high activity of the pancreatin. Ordinary high temperature sterilization processes kill the enzyme. Difficulties have been experienced in attempts to sterilize it.

We have discovered that ethylene oxide gas may be used to sterilize pancreatin without loss of activity. We have found also that the gas may be used under a wide variety of conditions to sterilize it, the conditions determining the degree of sterilization. Time and temperature are some of the variable factors, and the degree of sterilization is controllable through such variables.

The primary object of the process is to sterilize pancreatin without loss of enzymic activity.

A more particular object of the invention is to assure such sterilization with at least a 98% bacterial kill.

Pancreatin has a bacterial count which in samples we have tested has varied from 5,000 to 45,000 bacteria per gram, with a low mold count of about 100 per gram. At least some of the bacteria seem to be very resistant to the action of ethylene oxide gas.

When pancreatin is merely subjected to an ethylene oxide atmosphere at normal pressure for one hour at 70° F., a kill of 90% may be obtained. The resistant forms survive. By the simple expedient of carrying out this process by quickly evacuating air from the pancreatin to about 22 to 23 inches at 70° F., then admitting ethylene oxide to secure penetration, as for example at a vault concentration of 1 lb. per 35 cu. ft. (with vacuum of 18 to 19 inches retained), the kill is about 95% in one hour. This is at a less gas concentration than first mentioned, but contact and permeation are increased by the evacuation, followed by gas admission to the evacuated material. Under these same last-mentioned conditions, but with temperature from 70° F. to 100° F., the kill is still about 95%. This may be made even higher by more severe conditions.

We have found that above 130° F. the enzymic activity is lost, and hence avoid this high temperature. For safety, we set 120° F. as the preferred upper limit, but intend that the process with care may be operated up to 130° F. or short of the danger point. This seems to be somewhat variable with moisture content. The temperatures given are for the gas and material in the chamber. Where we obtain 99.72% bacterial efficiency, we produce 100% mold kill. This is in accordance with our observations in other fields that molds are far less resistant than the bacteria, and that a satisfactory result as to bacteria assures a satisfactory result as to molds.

In preferred practice to assure constant results, we perform the process by heating the material to 110° F., and drawing a vacuum of about 22 inches in about 20 minutes, exposing the material to the said vacuum at 110° F. for an hour, then admitting gas at a vault concentration of 1 lb. per 35 cu. ft. of vault space (which reduces the vacuum to about 18 inches), and subjecting the material to the gas for 2½ hours. A bacterial kill of 99.72% or higher is regularly obtained. Frequently a 100% sterile product results.

We believe that the high evacuation for a long time at temperatures of 110° F. and higher is a sort of activation of the material which materially shortens the time for a given kill, or increases the kill for a given time. High evacuation, followed by increase of pressure from the admission of ethylene oxide gas, assures quick and intimate contact of gas and material.

For a useful sterilized product of at least 98% kill of bacteria, we define a preferred process broadly as one requiring high vacuum, at 90° F. to 130° F., with activation, followed by exposure at the same temperature range to undiluted ethylene oxide gas at a concentration of at least 1 lb. per 35 cu. ft. for the time period of 3½ hours to 1 hour, the longer time for the lower temperature and the shorter time for the higher temperature.

The sterilized product may be used as a pharmaceutical product or be added to foodstuffs to introduce pancreatin without danger of innoculating the material with those bacteria which abound in animal body products.

From the foregoing it will be obvious that the conditions may readily be chosen and treatment changed to effect sterilization to varying degrees. The important teaching is that substantially undiluted ethylene oxide gas at temperatures up to 130° F. as a safe limit, for a prolonged period of time can destroy bacteria without destroying the enzymic activity.

We claim:

1. The method of treating pancreatin to reduce the bacterial and mold count thereof and preserve activity therein, which comprises treating the pancreatin to a high vacuum for about 1 hour at a temperature of 110° F. to 120° F. whereby to activate the material and render it receptive of sterilizing gas, and subjecting the evacuated material to the action of an atmosphere of substantially undiluted ethylene oxide gas at a concentration of at least 1 lb. per 35 cu. ft of vault space at a temperature range of 90° to 120° F. for a corresponding time period of 3½ hours to 1 hour.

2. The method of treating pancreatin to reduce the bacterial and mold count thereof and preserve activity therein, which comprises treating the pancreatin at a temperature from 110° to 130° F. to a high vacuum for about 1 hour to activate the material and render it receptive of sterilizing gas, and subjecting the evacuated material to the action of an atmosphere of substantially undiluted ethylene oxide gas at a concentration of at least 1 lb. per 35 cu. ft. of vault space for 2½ hours at 110° F. to 130° F.

3. The method of treating pancreatin to reduce the bacterial and mold count thereof and preserve activity therein, which comprises exhausting air from the material with a high vacuum, exposing the evacuated material at 110° F. for about 1 hour to the effect of the vacuum, introducing substantially undiluted ethylene oxide gas at a concentration of at least 1 lb. per 35 cu. ft. of vault space, and exposing the material to said gas for 2½ hours at 110° F.

4. The method of treating pancreatin to reduce the bacterial and mold count thereof and preserve activity therein, which comprises treating the pancreatin at a temperature from 110° F. to 130° F. to a high vacuum for about 1 hour to activate the material and render it receptive of sterilizing gas, and subjecting the evacuated material to the action of an atmosphere of substantially undiluted ethylene oxide gas at a concentration of at least 1 lb. per 35 cu. ft. of vault space at a temperature range of 90° F. to 130° F. for a time period of 3½ hours to 1 hour.

5. The method of treating pancreatin to reduce the bacterial and mold count thereof and preserve activity therein, which comprises treating the pancreatin at a temperature from 110° F. to 130° F. to a high vacuum for about 1 hour to activate the material and render it receptive of sterilizing gas, and subjecting the evacuated material to the action of an atmosphere of substantially undiluted ethylene oxide gas at a concentration of at least 1 lb. per 35 cu. ft. of vault space at a temperature range of 90° F. to 120° F. for a time period of 3½ hours to 1 hour.

6. The method of treating pancreatin to reduce the bacterial and mold count thereof and preserve activity therein, which comprises treating the pancreatin at a temperature from 110° F. to 120° F. to a high vacuum for about 1 hour to activate the material and render it receptive of sterilizing gas, and subjecting the evacuated material to the action of an atmosphere of substantially undiluted ethylene oxide gas at a concentration of at least 1 lb. per 35 cu. ft. of vault space at a temperature range of 90° F. to 130° F. for a time period of 3½ hours to 1 hour.

CARROLL L. GRIFFITH.
LLOYD A. HALL.